(12) United States Patent
Maggioni

(10) Patent No.: US 8,109,696 B2
(45) Date of Patent: Feb. 7, 2012

(54) SHEET-LIKE ELEMENT SUCH AS A NET, PARTICULARLY FOR GEOTECHNICAL APPLICATIONS

(75) Inventor: Pierluigi Maggioni, Barzano (IT)

(73) Assignee: Tenax S.P.A., Vigano' (IT)

( * ) Notice: Subject to any disclaimer, the term of this patent is extended or adjusted under 35 U.S.C. 154(b) by 0 days.

(21) Appl. No.: 12/087,731

(22) PCT Filed: Nov. 9, 2006

(86) PCT No.: PCT/EP2006/010742
§ 371 (c)(1),
(2), (4) Date: Jul. 14, 2008

(87) PCT Pub. No.: WO2007/095979
PCT Pub. Date: Aug. 30, 2007

(65) Prior Publication Data
US 2010/0067991 A9    Mar. 18, 2010

(30) Foreign Application Priority Data
Feb. 22, 2006   (IT) .............................. MI2006A0320

(51) Int. Cl.
*E02D 17/00*   (2006.01)
(52) U.S. Cl. ........................ 405/302.7; 442/58
(58) Field of Classification Search .................. None
See application file for complete search history.

(56) References Cited

U.S. PATENT DOCUMENTS

| | | | |
|---|---|---|---|
| 4,374,798 A | 2/1983 | Mercer | |
| 4,399,184 A | 8/1983 | Nalle, Jr. | |
| 4,815,892 A * | 3/1989 | Martin | 405/45 |
| 4,980,227 A | 12/1990 | Sekiguchi et al. | |
| 5,833,401 A * | 11/1998 | Olson | 405/129.75 |
| 5,965,467 A * | 10/1999 | Stevenson et al. | 442/218 |
| 6,056,479 A * | 5/2000 | Stevenson et al. | 405/302.7 |
| 6,093,663 A * | 7/2000 | Ouellette et al. | 442/5 |
| 6,505,996 B1 * | 1/2003 | Ianniello et al. | 405/36 |
| 6,729,807 B1 * | 5/2004 | Spittle | 405/302.7 |
| 6,948,886 B1 * | 9/2005 | Jackson | 405/302.6 |
| 7,131,788 B2 * | 11/2006 | Ianniello et al. | 405/50 |
| 7,309,188 B2 * | 12/2007 | Ianniello et al. | 405/129.95 |
| 7,465,129 B2 * | 12/2008 | Singleton | 405/302.7 |
| 7,470,094 B2 * | 12/2008 | Heathcott et al. | 405/302.7 |
| 2002/0044842 A1 * | 4/2002 | Ianniello et al. | 405/302.7 |
| 2003/0118410 A1 * | 6/2003 | Race | 405/302.7 |
| 2003/0178122 A1 | 9/2003 | Ianniello et al. | |
| 2005/0025582 A1 * | 2/2005 | Ianniello | 405/302.4 |
| 2006/0133900 A1 * | 6/2006 | Singleton | 405/302.7 |
| 2007/0104543 A1 * | 5/2007 | Heathcott et al. | 405/302.7 |

FOREIGN PATENT DOCUMENTS

EP   0 259 165 A   3/1988

\* cited by examiner

*Primary Examiner* — Tara Mayo-Pinnock
(74) *Attorney, Agent, or Firm* — Modiano & Associati; Albert Josif; Daniel O'Byrne

(57) ABSTRACT

A sheet-like element, such as a net, particularly for geotechnical applications, comprising a sheet-like body formed by superimposing at least two sets of filaments in order to provide a lattice-like structure, the sheet-like body being provided by a first polymer, which defines the lattice-like structure, and a second polymer, which is coextruded together with the first polymer and affects at least regions of at least one face of the sheet-like body, the first polymer having physical and mechanical characteristics of compressive and tensile strength, while the second polymer has a high friction coefficient.

9 Claims, 4 Drawing Sheets

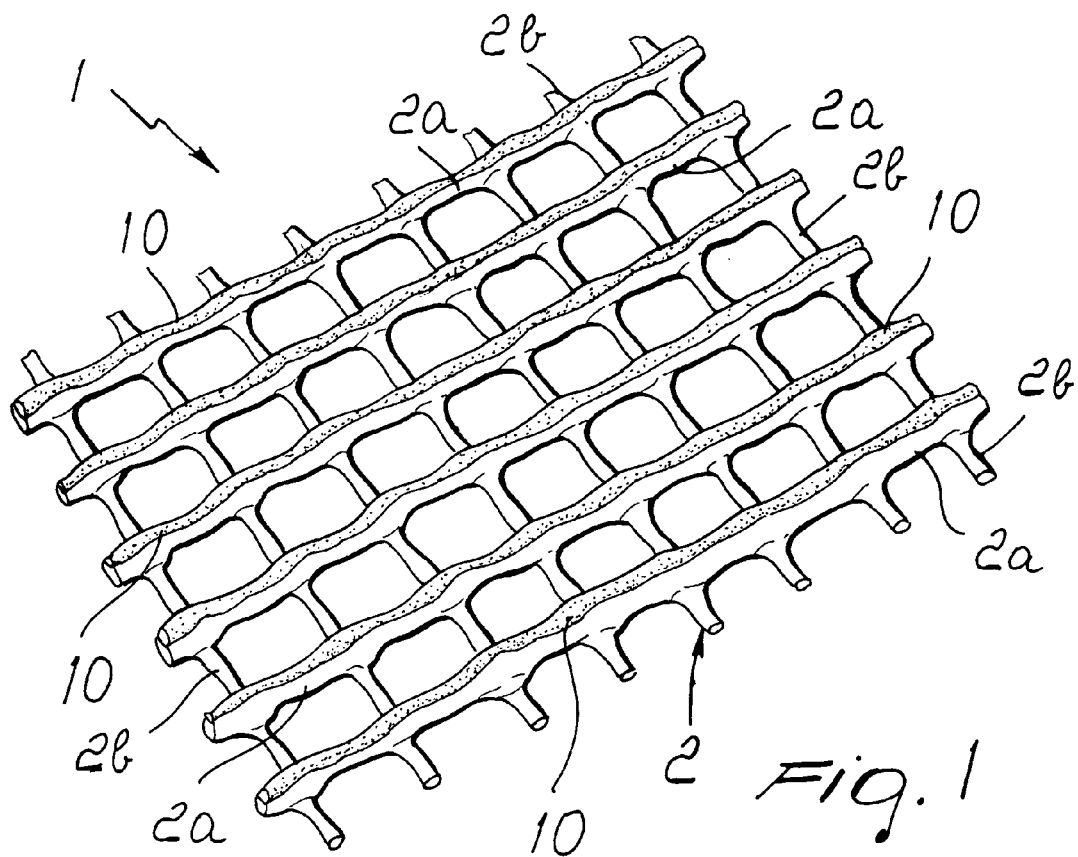
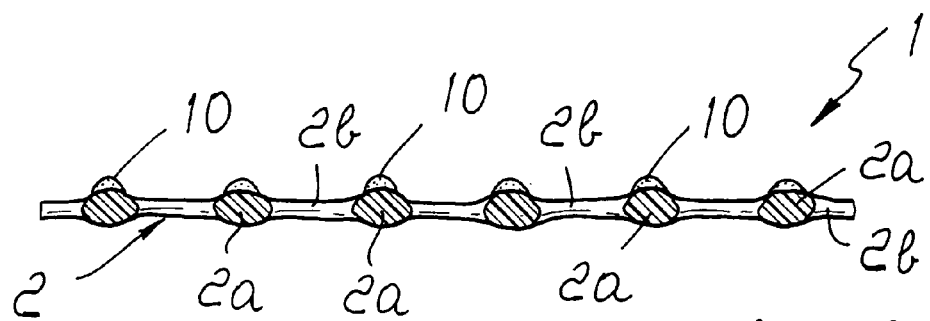
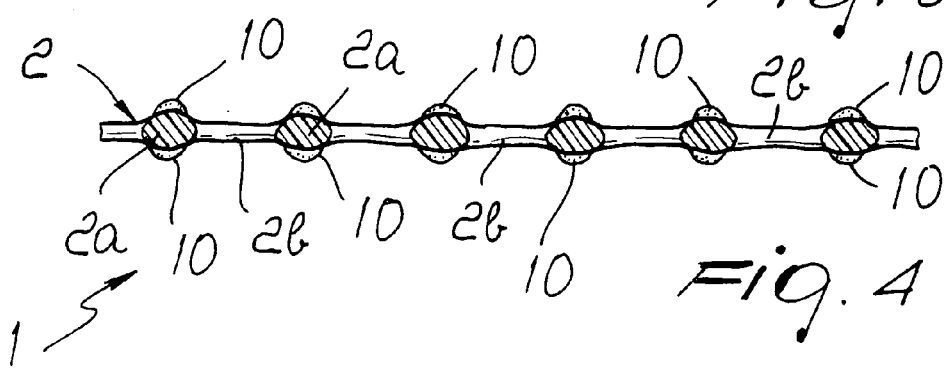

SHEET-LIKE ELEMENT SUCH AS A NET, PARTICULARLY FOR GEOTECHNICAL APPLICATIONS

The present invention relates to a sheet-like element such as a net, particularly for geotechnical applications.

BACKGROUND OF THE INVENTION

As is known, sheet-like elements provided by means of a net having the most disparate shapes, obtained by extruding a plastic polymer, are used in the geotechnical field.

The plastic polymer, generally constituted by polyethylene or propylene, is designed so as to have optimum compressive and tensile strength, so as to achieve the intended functionality and durability.

However, such solutions have a relatively high surface hardness, which entails a limited possibility of grip of the net on the surface to which it is applied.

Especially in cases in which the net is connected to a membrane of a landfill site or on the plastic wall for containing soil in general, waste sludge or sewage, the net would tend to slip, and it is therefore necessary to use practical solutions which allow to stabilize the net in position, creating a series of operations which are generally laborious and expensive.

If the net is applied to a chemically compatible covering layer, such as for example nonwoven fabric, or other nets having different characteristics, it is necessary to increase the treatment temperature so as to reach the surface melting point of the polymer that constitutes the net, in some cases possibly degrading the inherent characteristics of the product.

SUMMARY OF THE INVENTION

The aim of the invention is to eliminate the drawbacks cited above by providing a sheet-like element, such as a net, particularly for geotechnical applications, which can have optimum friction characteristics which allow its easy application with the possibility to keep the net in position without having to resort to additional refinements in application.

Within this aim, an object of the invention is to provide a sheet-like element which allows easier coupling of a layer, without damaging or degrading the net proper.

Another object of the present invention is to provide a sheet-like element which, thanks to its particular constructive characteristics, is capable of giving the greatest assurances of reliability and safety in use.

Another object of the present invention is to provide a sheet-like element, such as a net, particularly for geotechnical applications, which can be obtained easily starting from commonly commercially available elements and materials and is also competitive from a merely economical standpoint.

This aim and these and other objects, which will become better apparent hereinafter, are achieved by a sheet-like element, such as a net, particularly for geotechnical applications, according to the invention, comprising a sheet-like body formed by superimposing at least two sets of filaments in order to provide a lattice-like structure, characterized in that said sheet-like body is provided by means of a first polymer, which defines said lattice-like structure, and a second polymer, which is coextruded together with said first polymer and affects at least regions of at least one face of said sheet-like body, said first polymer having physical and mechanical characteristics of compressive and tensile strength, said second polymer having a high friction coefficient.

BRIEF DESCRIPTION OF THE DRAWINGS

Further characteristics and advantages of the present invention will become better apparent from the description of some preferred but not exclusive embodiments of a sheet-like element, such as a net, particularly for geotechnical applications illustrated by way of non-limiting example in the accompanying drawings, wherein:

FIG. 1 is a schematic perspective view of the sheet-like body;

FIG. 3 is a sectional view of the sheet-like body, with the second polymer on one face;

FIG. 4 is a sectional view of a sheet-like body with the second polymer on both faces;

DESCRIPTION OF THE PREFERRED EMBODIMENTS

Figure 2:
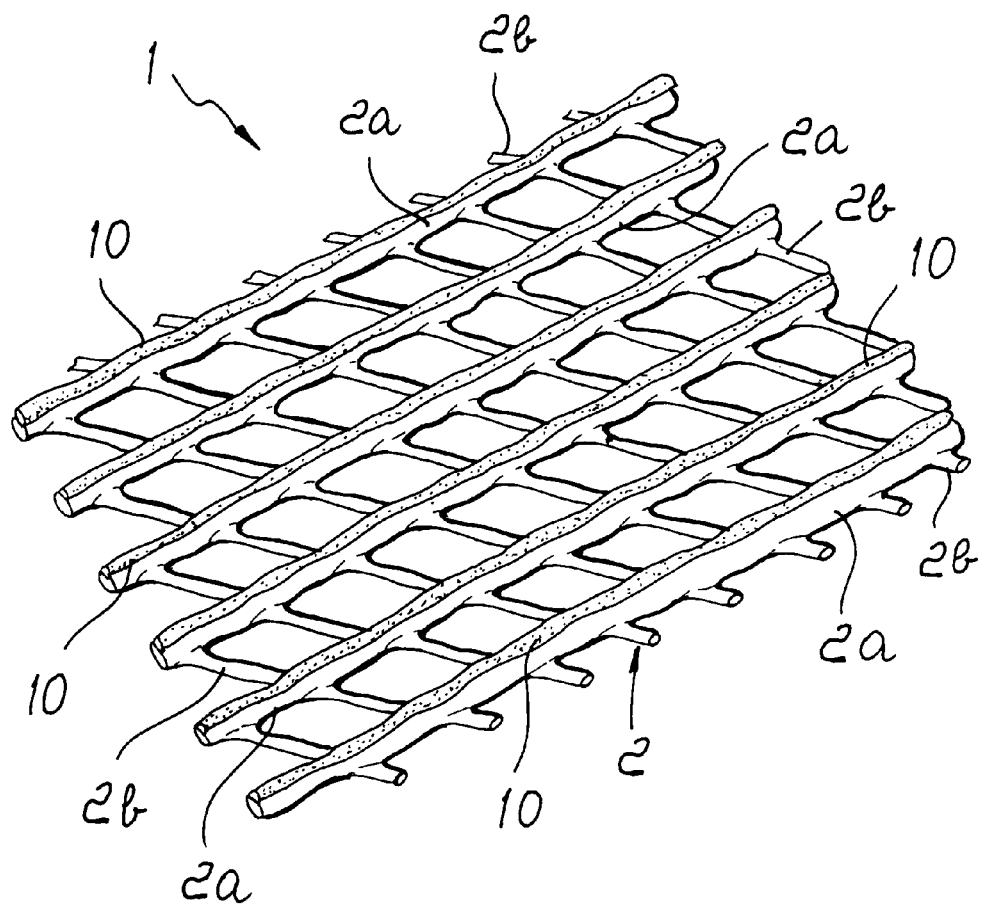
FIG. 2 is a schematic view of another embodiment of the sheet-like element.
Figure 5:
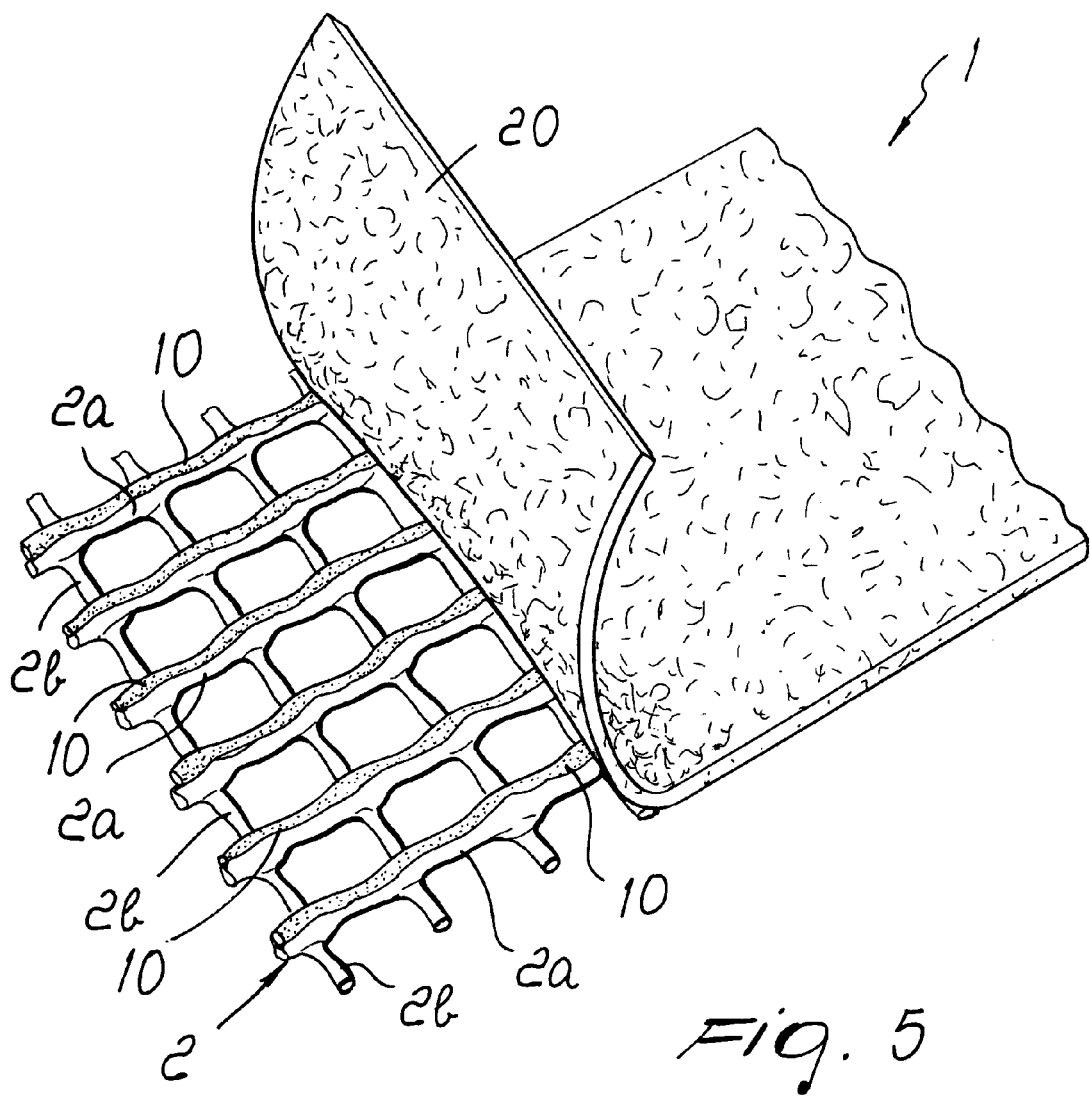
FIG. 5 is a schematic perspective view of the application of an outer layer to one face of the sheet-like body.
Figure 6:
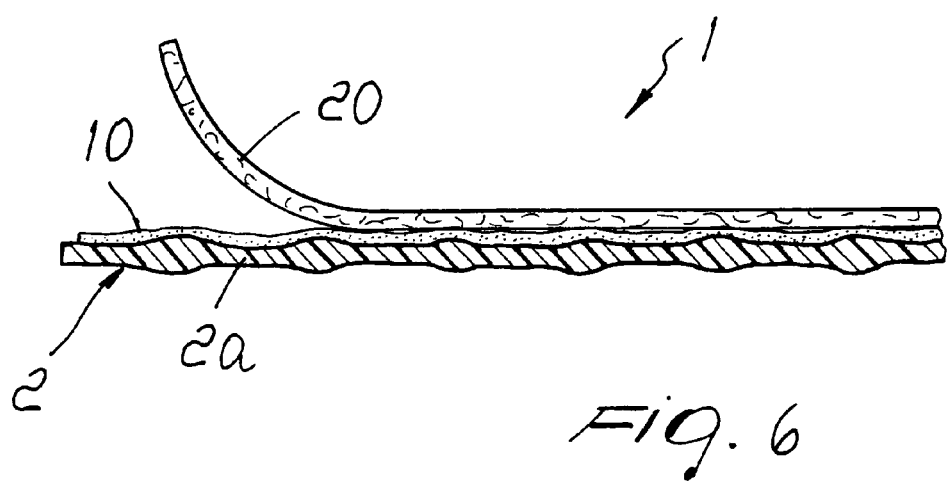
FIG. 6 is a sectional view of the application of an outer layer to one face.
Figure 7:
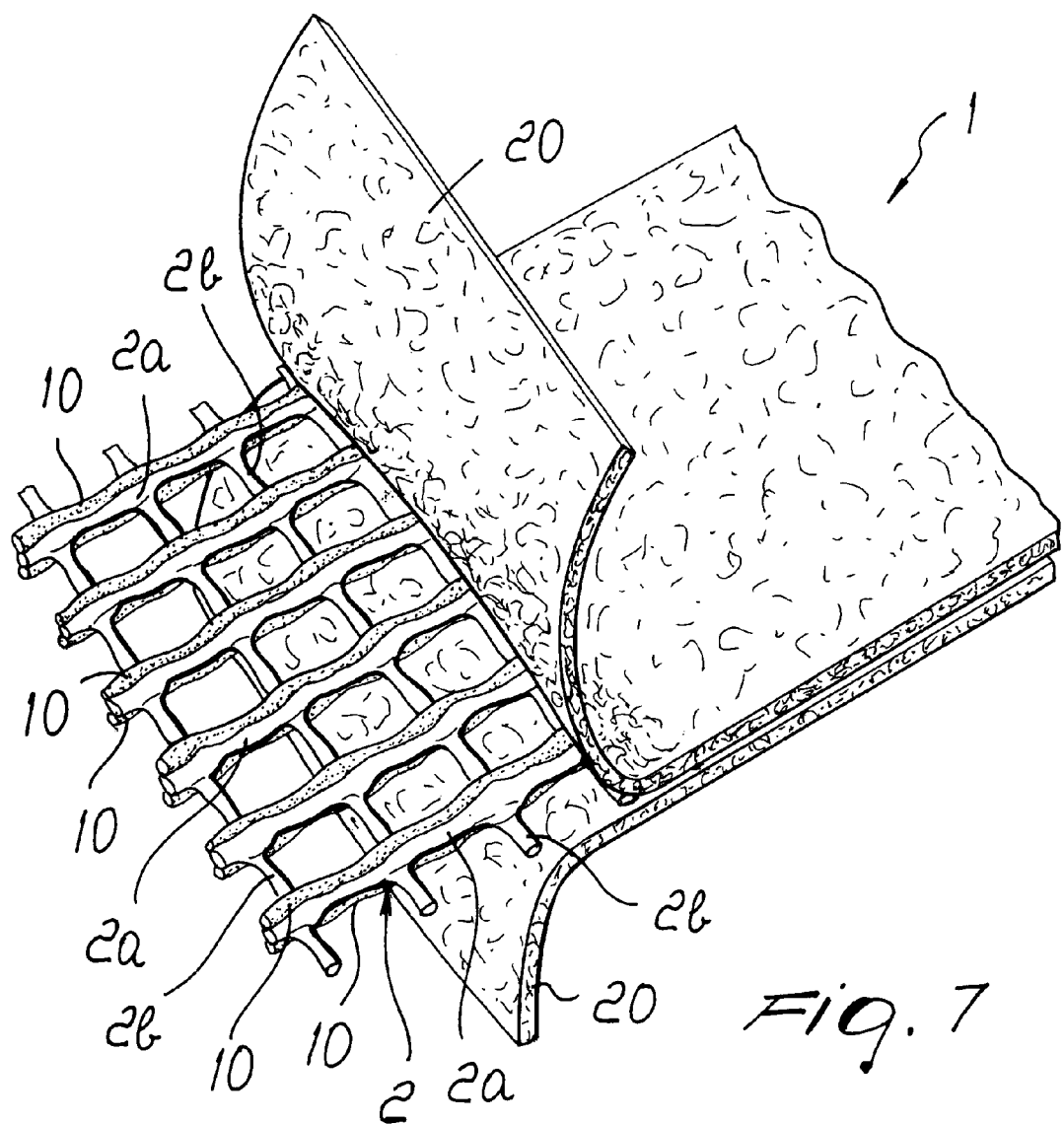
FIG. 7 is a perspective view of the application of an outer layer to both faces of the sheet-like body.
Figure 8:
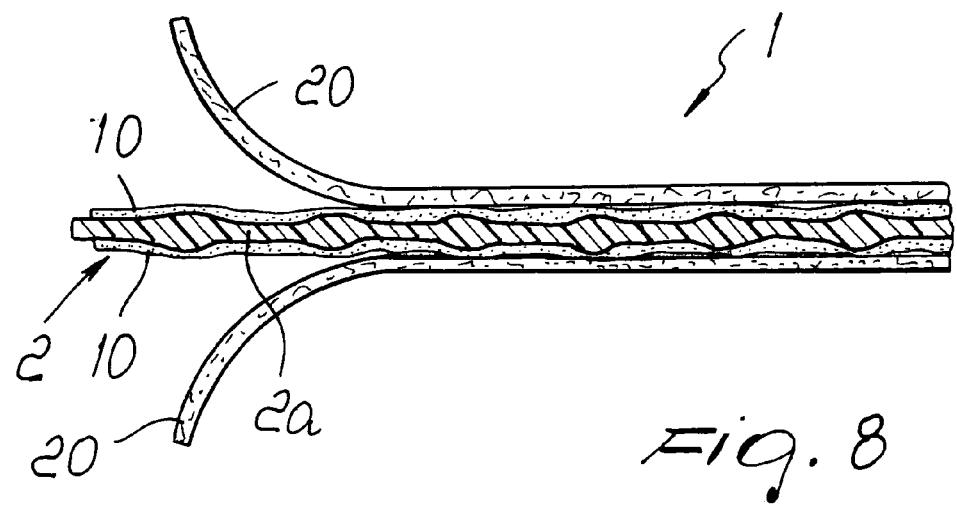
FIG. 8 is a sectional view of the application of an outer covering layer to both faces.

With reference to the figures, the sheet-like element, such as a net, particularly for geotechnical applications, according to the invention, generally designated by the reference numeral 1, comprises a sheet-like body 2, which is obtained by superimposing at least two sets of filaments which, by means of per se known techniques, are obtained by extrusion, so as to form a lattice-like structure.

In the exemplary embodiments shown, there are longitudinal filaments 2a and transverse filaments 2b, which intersect in order to form square or diamond-shaped meshes, but of course the type of net may be any.

The sheet-like body 2 is obtained by means of a first polymer or base polymer, constituted typically by polyethylene or polypropylene, which has the physical and mechanical characteristic of allowing excellent compressive and tensile strength, thus transferring also to the net these characteristics and achieving the required functional strength and durability.

A particular characteristic consists in that the sheet-like body is obtained by coextruding a second polymer which provides regions 10, and which is chemically compatible with the first polymer, so as to obtain a single mass without discontinuities.

The second polymer is again constituted by polyethylene or polypropylene, which is filled with rubber-like materials, such as ethyl vinyl acetate resins, so as to obtain a product which has a high friction coefficient and further provides, on at least one face, the regions designated by the reference numeral 10 which have a reduced surface hardness.

The first and second polymers cannot separate from each other accidentally or intentionally, since they have the same basic chemical composition and, once extruded, form a single element, albeit with physical characteristics of elasticity, hardness, color and the like which may be different.

The presence of the layer obtained by means of the second polymer allows to have a net which can be applied easily in the different uses with the assurance that it remains in position, since the high friction coefficient prevents its movement.

Moreover, if the net is connected to an outer layer 20, it is possible to use lower coupling temperatures, since the layer constituted by the second polymer has a lower melting point and accordingly it is possible to apply the outer layer 20 at lower temperatures without damaging the inherent structure of the sheet-like body.

As clearly shown in the figures, it is possible to apply the outer layer 20 to a single face or optionally to both faces, and in this case the regions made of the second polymer must be provided on both faces.

From what has been described above it is therefore evident that the invention achieves the intended aim and objects, and in particular the fact is stressed that a sheet-like element, such as a net, is provided which allows to make all geotechnical applications particularly advantageous, thanks to the improved grip capacity of said net, improving the potential and characteristics of application of a product which has been known for some time.

Moreover, the possibility to allow easier coupling of the outer layer provides the advantage of obtaining a product which does not damage the inherent structure of the net which is entrusted with mechanical compressive and tensile strength.

The invention thus conceived is susceptible of numerous modifications and variations, all of which are within the scope of the appended claims.

All the details may further be replaced with other technically equivalent elements.

In practice, the materials used, as well as the contingent shapes and dimensions, may be any according to requirements.

The disclosures in Italian Patent Application No. MI2006A000320 from which this application claims priority are incorporated herein by reference.

What is claimed is:

1. A net for geotechnical applications, comprising an extruded polymer sheet body formed by superimposing two sets of filaments in order to provide a lattice structure, said two sets of filaments mutually intersecting to form meshes, and said two sets of filaments being made of a first polymer, wherein said sheet body is provided by means of said first polymer and a second polymer, said first polymer and said second polymer together defining said lattice structure, said first and second polymers being mutually coextruded together to form said extruded polymer sheet body as a single element, and said second polymer being arranged at regions of at least one face of said sheet body such that said first polymer and said second polymer form said net as said single element having said lattice structure, said regions of said second polymer comprising a plurality of mutually parallel linear strands being arranged on and extending exclusively along one set of said two sets of filaments, said first polymer having physical and mechanical characteristics of compressive and tensile strength, said second polymer having a reduced surface hardness with respect to said first polymer.

2. A net according to claim 1, wherein said first and second polymers are chemically compatible.

3. A net according to claim 1, wherein said first and second polymers are polyethylene-based.

4. A net according to claim 1, wherein said first and second polymers are polypropylene-based.

5. A net according to claim 1, wherein said second polymer is filled with rubber materials.

6. A net according to claim 1, wherein said second polymer is filled with ethyl vinyl acetate resins.

7. A net according to claim 1, wherein said second polymer has a lower melting point than said first polymer.

8. A net according to claim 1, wherein said second polymer affects at least regions formed on both faces of said sheet body.

9. A net according to claim 8, wherein said at least regions provided with said second polymer are adapted to act as an adhesive element for the connection of at least one outer layer.

\* \* \* \* \*